(12) United States Patent
Ward, Sr.

(10) Patent No.: US 6,408,566 B1
(45) Date of Patent: Jun. 25, 2002

(54) FLOATING FISHING LURE

(76) Inventor: Fred Ward, Sr., 2663 W. Lone Cactus Dr. Suite D, Phoenix, AZ (US) 85027-2414

( * ) Notice: Subject to any disclaimer, the term of this patent is extended or adjusted under 35 U.S.C. 154(b) by 0 days.

(21) Appl. No.: 09/567,310

(22) Filed: May 8, 2000

(51) Int. Cl.[7] .............................................. A01K 85/00
(52) U.S. Cl. .................... 43/42.31; 43/42.24; 43/42.06; 43/42.26
(58) Field of Search .............. 43/42.06, 42.24, 43/42.26, 42.31, 42.37

(56) References Cited

U.S. PATENT DOCUMENTS

| | | | | |
|---|---|---|---|---|
| 2,484,744 A | * | 10/1949 | Roman | 43/42.06 |
| 2,550,704 A | * | 5/1951 | Lizun | 43/42.06 |
| 2,619,760 A | * | 12/1952 | Maddux | 43/42.15 |
| 3,121,291 A | * | 2/1964 | Iffland, Jr. et al. | 43/44.81 |
| 4,050,181 A | * | 9/1977 | Young et al. | 43/42.06 |
| 4,763,436 A | * | 8/1988 | Lindmeyer | 43/42.1 |
| 4,835,897 A | * | 6/1989 | Rudolph | 43/42.06 |
| 5,625,975 A | * | 5/1997 | Imes | 43/42.09 |
| 5,640,798 A | * | 6/1997 | Garst | 43/42.53 |
| 6,173,523 B1 | * | 1/2001 | Johnson | 43/42.24 |

* cited by examiner

*Primary Examiner*—Kurt Rowan
(74) *Attorney, Agent, or Firm*—H. Gordon Shields

(57) ABSTRACT

A floating fishing lure includes a flexible elongated element with an outwardly extending protrusion for slapping against the water. The outwardly extending protrusion slaps against the water as the lure is moved on the top of the water, both on open water as well as on or over weeds, lily pads, and the like. The lure may be segmented or smooth, as desired. Different embodiments of the lure are presented, included different configurations of the protrusion.

19 Claims, 2 Drawing Sheets

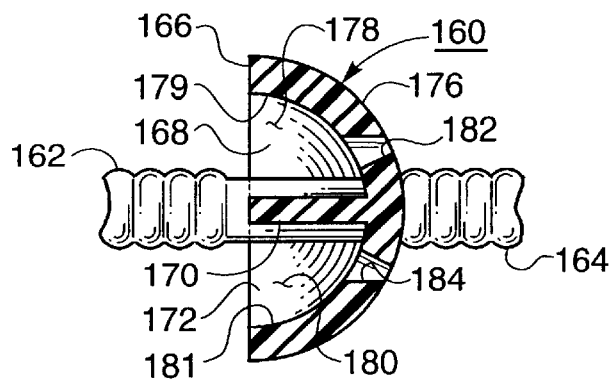
FIG. 9.
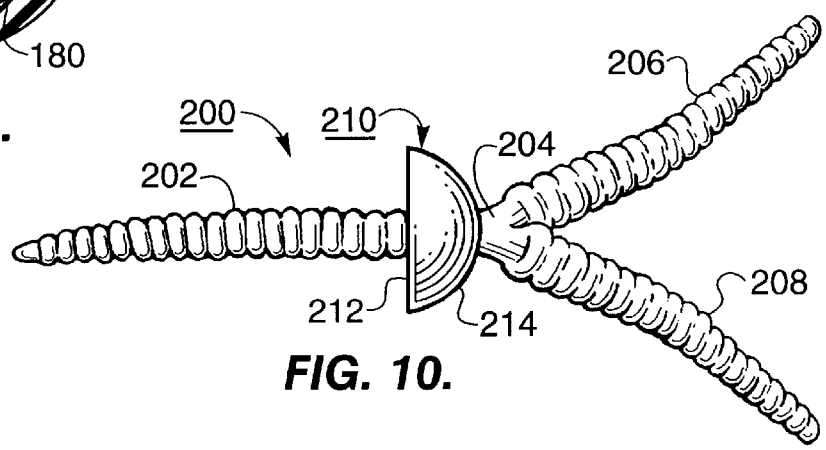
FIG. 10.
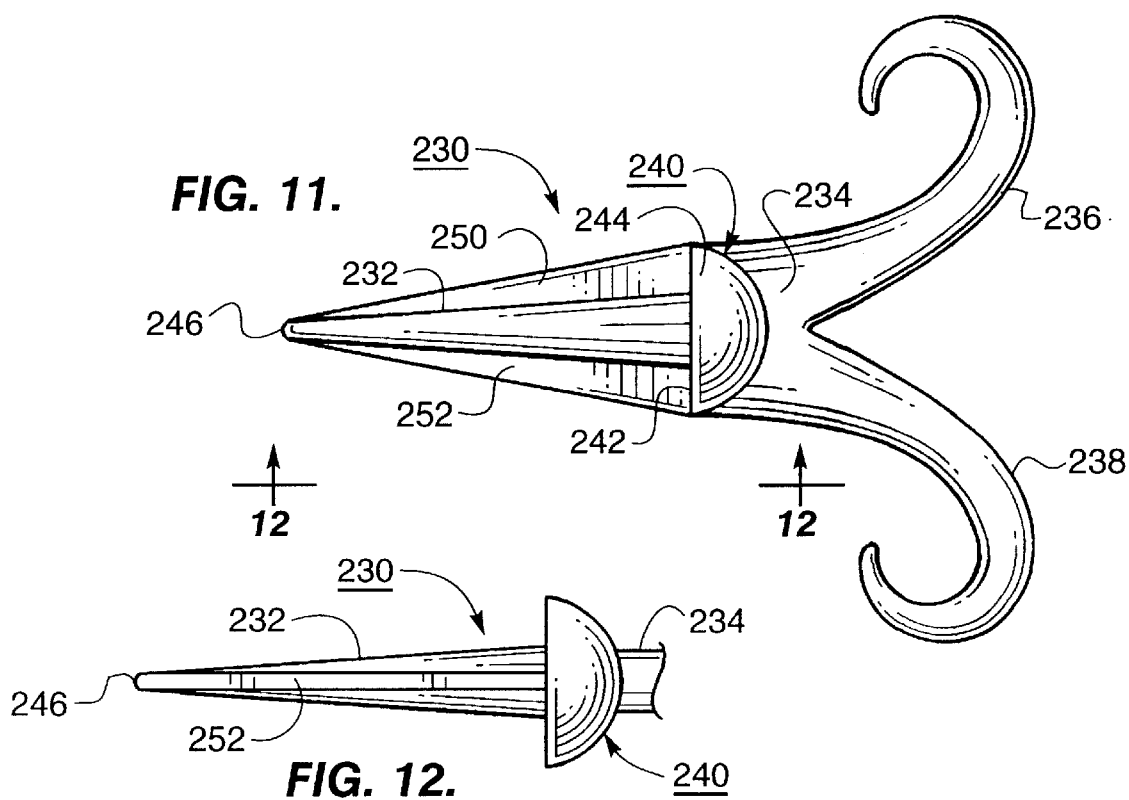
FIG. 11.
FIG. 12.

FLOATING FISHING LURE

BACKGROUND OF THE INVENTION

1. Field of the Invention

This invention relates to fishing lures and, more particularly, to a floating fishing lure which makes a noise as it causes splashes on the water as it moves on the top of the water.

2. Description of the Prior Art

Prior art fishing lures which float or move on the top surface of water, including over grass, lily pads, and the like, generally move rather silently. Some may move sinuously, but any noise or slapping of the water is purely incidental.

The fishing lure of the present invention includes outwardly extending extensions which slap against the water and accordingly make a noise to attract fish.

SUMMARY OF THE INVENTION

The invention described and claimed herein comprises a floating fishing lure made of a relatively flexible. elastomeric (plastic) material and which floats on the surface of water. Since the lure is flexible, it moves sinuously as it is dragged along the top of the water. An outwardly extending projection or protrusion causes the lure to slap against the water, thus making a noise and attracting fish to the lure.

Among the objects of the present invention are the following:

To provide a new and useful fishing lure;

To provide a new and useful floating fishing lure;

To provide a new and useful flexible fishing lure;

To provide a new and useful fishing lure which includes an outwardly extending projection to slap against the water as the lure moves; and To provide a new and useful flexible floating fishing lure which includes a projection which slaps against the water as the lure moves on the water.

BRIEF DESCRIPTION OF THE DRAWING

FIG. 9 is a view in partial section of another alternate embodiment of the apparatus of the present invention.

FIG. 10 is a top view of another alternate embodiment of the apparatus of the present invention.

FIG. 11 is a top view of another alternate embodiment of the apparatus of the present invention.

FIG. 12 is a side view of the apparatus of FIG. 11 taken generally along line 12—12 of FIG. 11.

DESCRIPTION OF THE PREFERRED EMBODIMENT

Figures 1, 2, 3, 4, 5, 6, 7, 8:
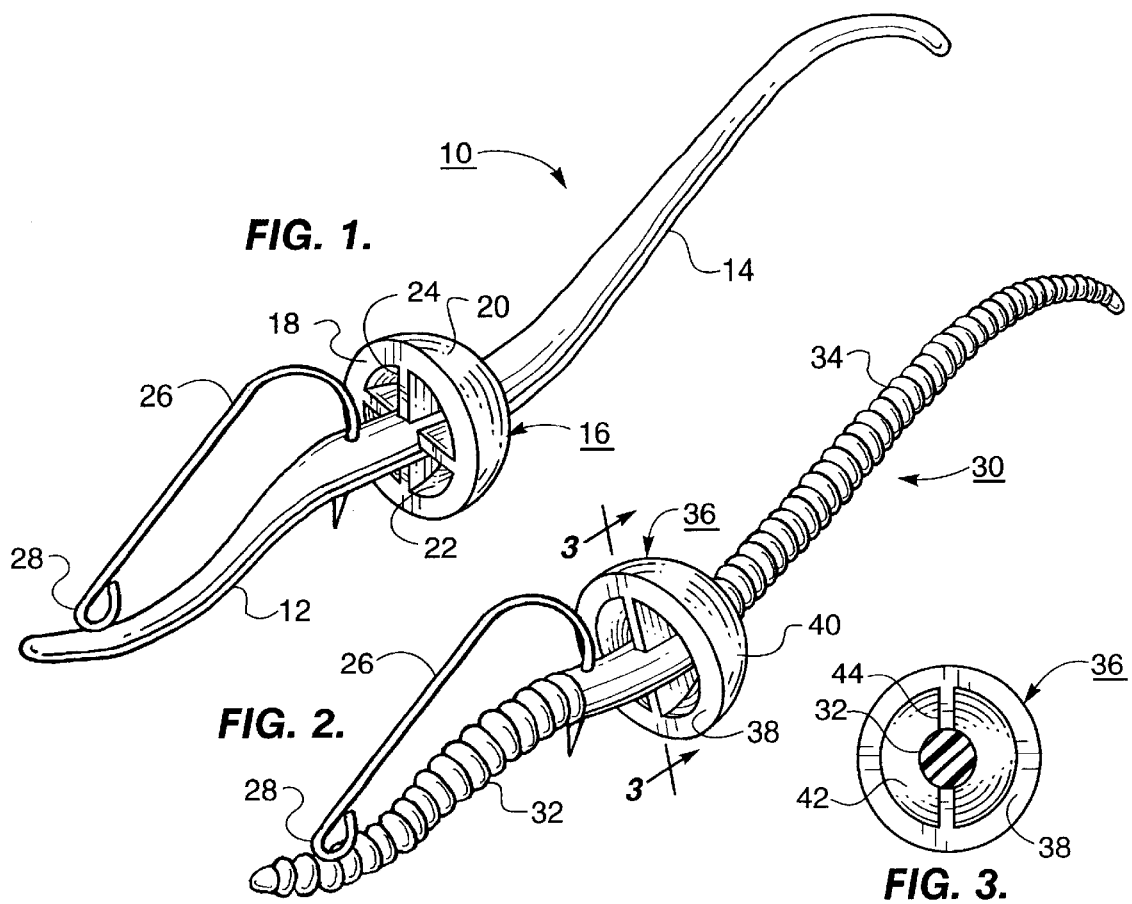
FIG. 1 is a perspective view of the apparatus of the present invention in its use environment.
FIG. 2 is a perspective view of an alternate embodiment of the apparatus of the present invention.
FIG. 3 is a view in partial section along line 3—3 of FIG. 1.
FIG. 4 is a view in partial section of an alternate embodiment of the apparatus of the present invention.
FIG. 5 is a view in partial section of another alternate embodiment of the apparatus of the present invention.
FIG. 6 is a view in partial section of another alternate embodiment of the apparatus of the present invention.
FIG. 7 is a view in patrial section of another alternate embodiment of the apparatus of the present invention.
FIG. 8 is a view in partial section of another alternate embodiment of the apparatus of the present invention.

FIG. 1 is a perspective view of floating fishing lure apparatus 10 embodying the present invention. The lure 10 is divided into two primary portions, a front portion 12 and a rear portion 14, by an outwardly extending protrusion 16.

The protrusion 16 includes a front face 18 which is generally perpendicular to the longitudinal axis of the body which includes the front portion 12 and the rear portion 14. The protrusion 16 is also coaxial with the front and rear portions. The protrusion 16 also includes a rear convex portion which extends rearwardly from the front face 18 to the real portion 14. Adjacent to the generally flat front face 18 is a front concave portion 22. A plurality of ribs 24 extend from. the front face 18 to the body 12 and rearwardly to the front concave portion 22.

The purpose of the rear convex portion is to provide stability for the front face 18 to insure that the front face 18 remains generally perpendicular to the longitudinal axis of the lure apparatus 10. That is, the front face 18 will remain in its general perpendicular orientation with respect to the longitudinal axis of the lure 10 as the lure is pulled across the top of water, lily pads, grass, etc. The ribs 24 provide the necessary stability, together with the mass of the convex portion 20, to insure the perpendicular axis orientation of the protrusion 16.

The purpose of the protrusion 16, with its generally perpendicular front face 18 and the front convex portion 22, is to essentially slap the water to make a noise as the lure apparatus 10 is moved on the top of the water. The lure apparatus 10 has a density of less than 1, and is accordingly lighter than water. It accordingly will float. As it is drawn across th e top of the water, or grass, or lily pads, etc., the protrusion will cause a slapping sound on the water to attract fish.

The lure 10 is also very flexible and may move sinuously as it is pulled along.

A fish hook 26 is embedded in the front portion 12. The fish hook 26 includes an eye 28 to which fishing line is connected for moving the lure apparatus 10 across the water.

FIG. 2 is a perspective view of lure apparatus 30 embodying the present invention. The lure apparatus 30 is similar to the lure apparatus 10 of FIG. 1, in that it includes a front portion 32, a rear portion 34, and a protrusion 36 dividing the two portions. However, the lure apparatus 30 includes a plurality of segments, while the lure apparatus 10 of FIG. 1 has a generally smooth outer configuration.

The front portion 32 and the rear portion 34 are both segmented which allows the lure apparatus 30 to move sinuously on the top of the water as it is pulled along.

As with the lure apparatus 10, the rear portion 34 is generally longer than the front portion 32. However, it is obvious that the protrusion may be located anywhere longitudinally with respect to the front and rear portions. The terms "front" and "rear" are thus relative in length; they are s imply the portions divided by the protrusion.

The protrusion 36 includes a generally flat front face 38 and a generally convex portion 40 extending rearwardly from the front face 38 to the rear portion 34. Again, the purpose of the protrusion 36, with its front face 38 is to provide a slapping function against the water as the lure apparatus 30 is pulled along. The mass of the convex portion 40 provides stability to maintain the front face 38 substantially perpendicular to the longitudinal axis of the lure 30.

FIG. 3 is a view in partial section taken generally along line 3—3 of FIG. 2, particularly illustrating the protrusion 36. The protrusion 36, as indicated above, includes a front face 38 which is generally perpendicular to the longitudinal axis of the body, including the front portion 32 as shown in FIG. 3 in partial section and the rear portion 34 (see FIG. 2). The protrusion 36 also includes a concave portion 42 extending rearwardly from the front face 38 and extending to the body 32. A plurality of ribs 44, illustrated as two, extend between the front face 38 and the body 32 and the concave portion 42 to provide the stability required to maintain the orientation of the front face 38 generally perpendicular to the longitudinal axis of the lure apparatus 30.

The number of ribs may vary, in addition to the mass of the protrusion, as required to maintain the structural integrity of the front face with respect to the perpendicularity of the lure's axis as the lure is pulled along.

Rather than having the protrusion extending substantially three hundred sixty degrees about the body of the lure, the protrusion may be divided into multiple portions, such as illustrated in FIGS. 4, 5, and 6. FIGS. 4, 5, and 6 are views in partial section of different protrusion configurations, each of which extends outwardly from the body of a lure.

In FIG. 4, a pair of protrusions 52 and 56 extend outwardly from the body 50. The protrusions 52 and 56 are diametrically opposed to each other and each includes a generally flat front face which is generally perpendicular to the longitudinal axis of the lure body. The front faces include a front face 54 and a front face 58. A concave portion 55 extends rearwardly from the front face 54, while a concave portion 59 extends rearwardly from the front face 58. As with the embodiments of FIGS. 1 and 2, the protrusions 54 and 56 include convex portions which provide the mass required to maintain the front faces 54 and 58 substantially perpendicular to the longitudinal axis of the body 50.

In FIG. 5, three protrusions 62, 66, and 70 are illustrated as extending outwardly from the body 60. The protrusions 62, 66, and 70 include front faces 64, 68, and 72, respectively, each of which is generally perpendicular to the longitudinal axis of the body 60. Again, there are concave and convex portions extending rearwardly from the front face, to provide the necessary mass for the protrusions, as discussed above.

FIG. 6, four protrusions 82, 86, 90, and 94 extend outwardly from a body 80. Each of the four protrusions includes a front face which is generally perpendicular to the longitudinal axis of the body 80. The front faces include a front face 84, a front face 88, a front face 92, and a front face 96. It will be noted that the front faces in the embodiment of FIG. 6 are generally flat for their entire surface area, and do not include concave portions. However, as with the other embodiments discussed above, each of the four protrusions include sufficient mass, preferably having a convex outer configuration, behind them to maintain the front faces generally perpendicular to the axis of the body 80.

FIG. 7 is a view in partial section showing a protrusion 100 extending outwardly from a body 102 portion. The protrusion 100 has a generally square configuration, with rounded corners. The protrusion 100 includes a front face 104 which is generally perpendicular to the longitudinal axis of the body portion 102.

Extending from the body portion 102 to the front face 104 are four ribs 106, 108, 110, and 112. Rearwardly of the front face 102 and between the ribs are four concave portions 114, 16, 118, and 120. The concave portion 114 is between the ribs 106 and 108. The concave portion 116 is between the ribs 108 and 110; the concave portion 118 is between the ribs 110 and 112; and the concave portion 120 is between the ribs 112 and 106. A convex portion, not shown in FIG. 7, extends rearwardly from the front face 104, and, of course, is behind the concave portions.

FIG. 8 is a view in partial section of a protrusion 130 which extends outwardly from a body portion 132. The protrusion 130 has a generally oval shape or configuration. The protrusion 130 includes a front face 134 which is generally perpendicular to the longitudinal axis of the body 132. The protrusion 130 includes four ribs 136, 138, 140, and 142 which extend outwardly from the body portion 132 to the front face 134, Four concavities are defined between the ribs, the body 132, and the front face 134. The concavities include a concavity 144 between the ribs 136 and 138, a concavity 146 between the ribs 138 and 140, a concavity 148 between the ribs 140 and 142, and a concavity 150 between the ribs 142 and 136. The outer configuration of the protrusion 130 is, like the other protrusions discussed above, generally convex.

FIG. 9 is a side view in partial section of another alternate embodiment of the apparatus of the present invention, comprising a protrusion 160. The protrusion 160 is disposed between a front lure portion 162 and a rear lure portion 164. The protrusion 160 includes a front face 166 and a rear convex portion or configuration 176.

The view of protrusion 160 in FIG. 9 shows three ribs 168, 170, and 172. The ribs extend rearwardly from the front face 166 to the rear of concave portions or chambers 178 and 180. The concavity or chamber 178 is defined by an inner rear concave wall 179 and the walls 168 and 170, and the concavity or chamber 180 is defined by an inner rear concave wall 181 and the walls 170 and 172.

An aperture or bore 182 extends through the rear concave wall of the chamber 178, and an aperture or bore 184 extends through the rear wall of the chamber 180. Both apertures or bores terminate on the outer convex surface 176. The apertures 182 and 184 are shown as converging, but they may also be of uniform diameter, if desired, or they may even be diverging. However, the converging configuration provides a spurting or outward spray of fountain effect in the water flow through them as the lure is pulled along the surface of the water. As is well known and understood, the effect of such converging or inward tapering of the apertures or bores is to increase the speed of the flow of the water through the bores, thus providing the desired spray. This effect may be helpful in attracting fish.

Note also that the body portions 162 and 164 are shown as differing in diameter. The diameters of the body portions may be the same, or they may differ, as desired. Moreover, the body portions are also shown as tapering in FIGS. 1 and 2, but they may also have a uniform diameter, if desired.

FIG. 10 is a top view of another alternate embodiment of the floating lure apparatus of the present invention, comprising a lure 200. There are two primary differences between lure apparatus 200 and the lure embodiments of FIGS. 1 and 2. The lure apparatus includes a segmented front portion 202 and a bifurcated rear portion 204. The rear portion 204 is bifurcated into a pair of outwardly extending tail portions 206 and 208.

Between the front portion 202 and the rear portion 204 is an outwardly extending protrusion 210. The protrusion 210 is substantially the same as the protrusions 16 and 36 of the embodiments of FIGS. 1, 2, and 3, discussed above. If desired, the protrusion 120 may be segmented, such as illustrated in FIGS. 4, 5, and 6, etc.

The protrusion 210 includes a front face 212 which is substantially perpendicular to the longitudinal axis of the front portion 202 and the rear portion 204 prior to the bifurcated tail portions. Again, the purpose of the protrusion 210, and its front face 212, is to slap the water as the lure 200 is dragged across the top of the water to attract fish. The protrusion 210 also includes a rear convex portion 214 to provide the necessary mass or strength to maintain the front face 212 substantially perpendicular to the longitudinal axis of the lure apparatus 2000 as the lure is dragged on top of the water.

FIG. 11 is a top view of another alternate embodiment of the apparatus of the present invention, specifically comprising an alternate embodiment of the lure apparatus 200 of FIG. 10. FIG. 12 ia a side view of the lure 230 of FIG. 11 taken generally along line 12—12 of FIG. 11. For the following discussion, reference will be made to both FIGS. 11 and 12.

Lure apparatus 230 includes a front portion 232, a rear portion 234, and an outwardly extending protrusion 240 between the front portion 232 and the rear portion 234. The rear portion 234 is also bifiucated, and includes a pair of tail elements 236 and 238. The tail elements 236 and 238 differ from the tail elements 206 and 208 of the lure apparatus 200 of FIG. 10 in that the tail elements 236 and 238 curl outwardly away from each other.

The protrusion 240 includes a front face 242 which is substantially perpendicular to the longitudinal axis of the lure apparatus 230. The protrusion 240 includes a convex rear surface portion 244 which covers the mass to provide the necessary strength to maintain the front face 242 substantially perpendicular to the longitudinal axis of the lure apparatus. This is, of course, substantially the same as discussed above for the other embodiments.

The lure apparatus 230 is illustrated as being generally smooth, rather than segmented. However, it is obvious that the lure apparatus 230 may be segmented rather than smooth, and likewise that the lure apparatus 200 may be smooth rather than segmented.

The lure apparatus 230 also differs from the lure apparatus 200 and the lure apparatus 10 of FIG. 1, and the lure apparatus of FIGS. 2 and 3, in that it includes a pair of membranes 250 and 252.

The front portion 232 includes a front end or tip 246, and a pair of relatively thin membranes 250 and 252 extend outwardly and rearwardly from the front end or tip 246 to the front face 242 of the protrusion 240. The membranes 250 and 252 are generally along the same plane as is the rear portion 234, with its bifurcated tail elements 236 and 238.

The purpose of the membranes 250 and 252 is to help maintain the planarity of the lure 230 as it is dragged across the top of the water.

The above described lures are all floating, flexible fishing lures. The lures will remain on the top of the water as they are dragged along by a fishing user. While each of the embodiments differ from one another, they all include an outwardly extending protrusion designed to slap the water as the lure is moved along the surface of the water. The body portions are preferable circular in configuration.

In all of the embodiments, the protrusions are disposed coaxially with the front and rear portions. This is so weather the protrusions are generally circular, as in FIGS. 1, 2, 3, 9, 10, 11, and 12, or whether they are rectangular as in FIG. 7 or oval as in FIG. 8, or in separate segments, as in FIGS. 4, 5, and 6. The front and rear portions are, of course, axially aligned.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A floating fishing lure comprising in combination:
    a body having a density less than that of water and having a longitudinal axis and a front portion for receiving a fish hook and a rear portion; and
    protrusion means coaxial with the front portion and the rear portion extending outwardly from the body between the front portion and the rear portion for contacting the water in a slapping manner as the lure is moved on water, including
        a concave portion and a rearwardly directed generally convex portion.
        a front face on the concave portion, and
        a plurality of ribs disposed in the concave portion and extending from said front face to the body for providing stability to maintain the front face generally perpendicular to the longitudinal axis.

2. The fishing lure of claim 1 in which the body is segmented to produce a sinuous movement on the water as it is moved.

3. The fishing lure of claim 1 in which the protrusion means extends outwardly substantially perpendicularly to the body.

4. The fishing lure of claim 1 in which the protrusion means includes a generally convex configuration facing the rear of the lure to prevent deformation of the protrusion means as the lure is moved.

5. The fishing lure of claim 1 in which the protrusion means includes a plurality of protrusions extending outwardly from the body.

6. The fishing lure of claim 5 in which the plurality of protrusions are spaced apart radially equidistant from each other.

7. The fishing lure of claim 6 in which the plurality of protrusions comprises two protrusions.

8. The fishing lure of claim 6 in which the plurality of protrusions comprises three protrusions.

9. The fishing lure of claim 6 in which the plurality of protrusions comprises four protrusions.

10. The fishing lure of claim 1 in which the body is generally circular in configuration.

11. The fishing lure of claim 1 in which the body is flexible to allow movement between the front end and the rear end as the lure is moved on water.

12. The fishing lure of claim 1 in which the body is elongated.

13. The fishing lure of claim 12 in which the body is generally circular in configuration.

14. The fishing lure of claim 13 in which the circular configuration of the body varies in diameter.

15. The fishing lure of claim 1 in which the protrusion means includes a protrusion and a front face on the protrusion.

16. The fishing lure of claim 15 in which the protrusion means further includes a bore extending through the protrusion.

17. The fishing lure of claim 1 in which the rear end includes a bifurcated tail.

18. The fishing lure of claim 17 in which the bifurcated tail includes a curved portion.

19. The fishing lure of claim 17 in which the body includes a front tip and a pair of webs extending from the front tip to the protrusion means.

* * * * *